United States Patent
Kirkham

(10) Patent No.: US 12,204,516 B2
(45) Date of Patent: *Jan. 21, 2025

(54) OBJECT DATA STORED OUT OF LINE VECTOR ENGINE

(71) Applicant: Actian Corporation, Round Rock, TX (US)

(72) Inventor: Ian Philip Kirkham, Gloucestershire (GB)

(73) Assignee: ACTIAN CORPORATION, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/432,962

(22) Filed: Feb. 5, 2024

(65) Prior Publication Data

US 2024/0256509 A1   Aug. 1, 2024

Related U.S. Application Data

(63) Continuation of application No. 17/830,015, filed on Jun. 1, 2022, now Pat. No. 11,928,093.

(60) Provisional application No. 63/209,358, filed on Jun. 10, 2021.

(51) Int. Cl.
    *G06F 16/20*   (2019.01)
    *G06F 16/22*   (2019.01)
(52) U.S. Cl.
    CPC ...... *G06F 16/2219* (2019.01); *G06F 16/2237* (2019.01)
(58) Field of Classification Search
    CPC .................. G06F 16/2219; G06F 16/2237
    See application file for complete search history.

(56) References Cited

U.S. PATENT DOCUMENTS

| | | |
|---|---|---|
| 5,548,769 A | 8/1996 | Baum et al. |
| 5,794,250 A | 8/1998 | Carino, Jr. et al. |
| 6,256,626 B1 | 7/2001 | Dong et al. |
| 6,356,946 B1 | 3/2002 | Clegg et al. |
| 6,738,790 B1 | 5/2004 | Klein et al. |
| 7,743,023 B2 | 6/2010 | Teodosiu et al. |

(Continued)

OTHER PUBLICATIONS

International Search Report and Written Opinion dated Oct. 17, 2022, issued by the International Searching Authority in related International Patent Application No. PCT/US2022/032329.

(Continued)

*Primary Examiner* — Mahesh H Dwivedi
(74) *Attorney, Agent, or Firm* — ArentFox Schiff LLP

(57) ABSTRACT

Examples described herein generally relate to database systems for storing and processing both small values that are smaller than size of a database column and large objects that exceed the size of the database column. A database management system (DBMS) determines that a value to be stored in a database is a large object having a size larger than a column of the database. The DBMS stores the value as a large object in an external storage associated with a token stored in the column of the database. The token includes information for processing the large object. A vector processing engine associated with the external storage processes the large object based on the information in the token in response to a database command from the DBMS on multiple records represented as a vector.

20 Claims, 7 Drawing Sheets

(56) References Cited

U.S. PATENT DOCUMENTS

| | | |
|---|---|---|
| 2001/0023420 A1* | 9/2001 | Dong ................ G06F 16/24561 |
| | | 707/999.005 |
| 2006/0047670 A1 | 3/2006 | Yu et al. |
| 2008/0114780 A1 | 5/2008 | Man et al. |
| 2016/0147750 A1 | 5/2016 | Blanco et al. |
| 2016/0179896 A1 | 6/2016 | Finlay et al. |
| 2017/0262638 A1 | 9/2017 | Horowitz et al. |
| 2021/0081421 A1 | 3/2021 | Lui et al. |
| 2022/0398235 A1 | 12/2022 | Kirkham |

OTHER PUBLICATIONS

Lamb, Charles, et al., "The Objectstore Database Sytsem", Communication of the ACM, vol. 34, No. 10, pp. 50-63, Oct. 1991, Retrieved on Sep. 10, 2022 from <https://dl.acm.org/doi/pdf/10.1145/125223.125244.

Shapiro, Michael, et al., "Managing Databases with Binary Large Objects", 16ths IEEE Symposium on Mass Storage Systems in cooperation with the 7th NASA Goddard Conference on Mass Storage Systems and Technologies (Cat. No. 99CB37098), IEEE, 1999, Mar. 18, 1999, Retrieved on Sep. 10, 2022 from <https://ieeexplore.ieee/org/abstract/document/830036.

* cited by examiner

OBJECT DATA STORED OUT OF LINE VECTOR ENGINE

CROSS REFERENCE TO RELATED APPLICATION

This application is a Continuation of U.S. application Ser. No. 17/830,015, filed on Jun. 1, 2022, which claims priority to U.S. Provisional Application No. 63/209,358 titled "OBJECT DATA STORED OUT OF LINE VECTOR ENGINE," filed Jun. 10, 2021. The disclosures of the prior applications are hereby incorporated in their entirety by reference.

TECHNICAL FIELD

The present disclosure relates to database systems, and particularly to database systems for storing object data outside of a line vector engine.

BACKGROUND

In conventional databases columns storing data of a particular type are often limited in size. For example, in some databases the maximum size for a column is 32 kilobytes. While this size may be sufficient for many types of data, there is also a need to store larger data objects. For example, data such as images, videos, or models may easily surpass limit for a column. Such data types may be referred to as large objects because such data is larger than the maximum size of the column.

One approach to storing large objects is to store a token in the database instead of the large object. The large object may be stored outside of the database and accessed via the token. Generally, every row in the column stores a token. Such a system allows storage of the large objects but is inefficient in several ways. First, using a token to store small value may be inefficient in terms of both storage space and processing efficiency as extra steps are required to redeem the token. Second, the external storage may result in inefficient handling of queries. For example, the database or database management system may transfer the large objects from the external storage in order to perform a simple operation on the objects. Accordingly, the handling of data, particularly large objects or simply large volumes is problematic when efficient query processing is needed.

Thus, there is a need in the art for improvements in database systems. In particular, there is a need for systems and methods for handling data that includes instances of both small values and large objects.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an example, the disclosure provides a method of database operation. The method may include determining that a value to be stored in a database is a large object having a size larger than a column of the database. The method may include storing the value as a large object in an external storage associated with a token stored in the column of the database, wherein the token includes information for processing the large object. The method may include processing, in response to a database command on multiple records represented as a vector, the large object according to the information of the token, by a vector processing engine associated with the external storage.

In another aspect, the disclosure provides a system for storing large objects in a database. The system includes a database management system that stores a database table having a maximum column size. The system includes an external storage server associated with a token stored in a column of the database. The token includes information for processing the large object. The external storage server includes a vector processing engine configured to process, in response to a database command on multiple records represented as a vector, the large object according to the information of the token.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

The present disclosure provides systems and methods for storing both values and large objects in a column of a database. The large objects may have a size that is larger than the column. The large objects may be stored in an external storage and associated with a token stored in the column of the database. The token may include information for processing the token. The large object may be processed by a vector processing engine at the remote storage in response to a database command on multiple records represented as a vector based on the information of the token. Accordingly, database commands may be applied to the large objects as if the large objects were a regular sized values stored in the column.

A database system may include a set of cooperating vector processing engines, to ensure that outsize data can be passed around and or operated on as needed. Each of the vector processing engines resides with a data lake or local pool of files and the knowledge of where the vector processing engine sits and how it is connected. These vector processing engines can serve the data on demand or execute requested operations on specific local data. Small results will go back in-line but large results will be set aside and a token substituted for later redemption—the token being passed on instead of the data.

The vector processing engines are vector processing database engines that can execute query instructions upon the data that they reside with. Each vector processing engine may hand off requests to further vector processing engines if so configured. In some implementations, the vector processing engines may lazily handle the data, for example, by sending small data back to the requestor but keeping large results at the vector processing engine, and instead passing a token to the requestor. The data can be redeemed as and when (or if) needed. Data that would have been unchanged by any operation will have a token referring to the base data; otherwise, freshly materialized or modified data would be cached for a time and the token made to refer to that. Re-execution can retrieve that cached data too if the cache item has not expired.

In some implementations, the vector processing engine may determine where to perform the processing to reduce an amount of network traffic. For example, if the database command and information for processing the large object request a value based on the large object, the vector processing engine may perform the processing at the remote storage and return only the requested value. In contrast, if the database command and information for processing the large object indicates redeeming the large object to the client, the vector processing engine may transmit the large object to the client without performing one or more operations that may be more efficiently performed at the client.

Figure 1:
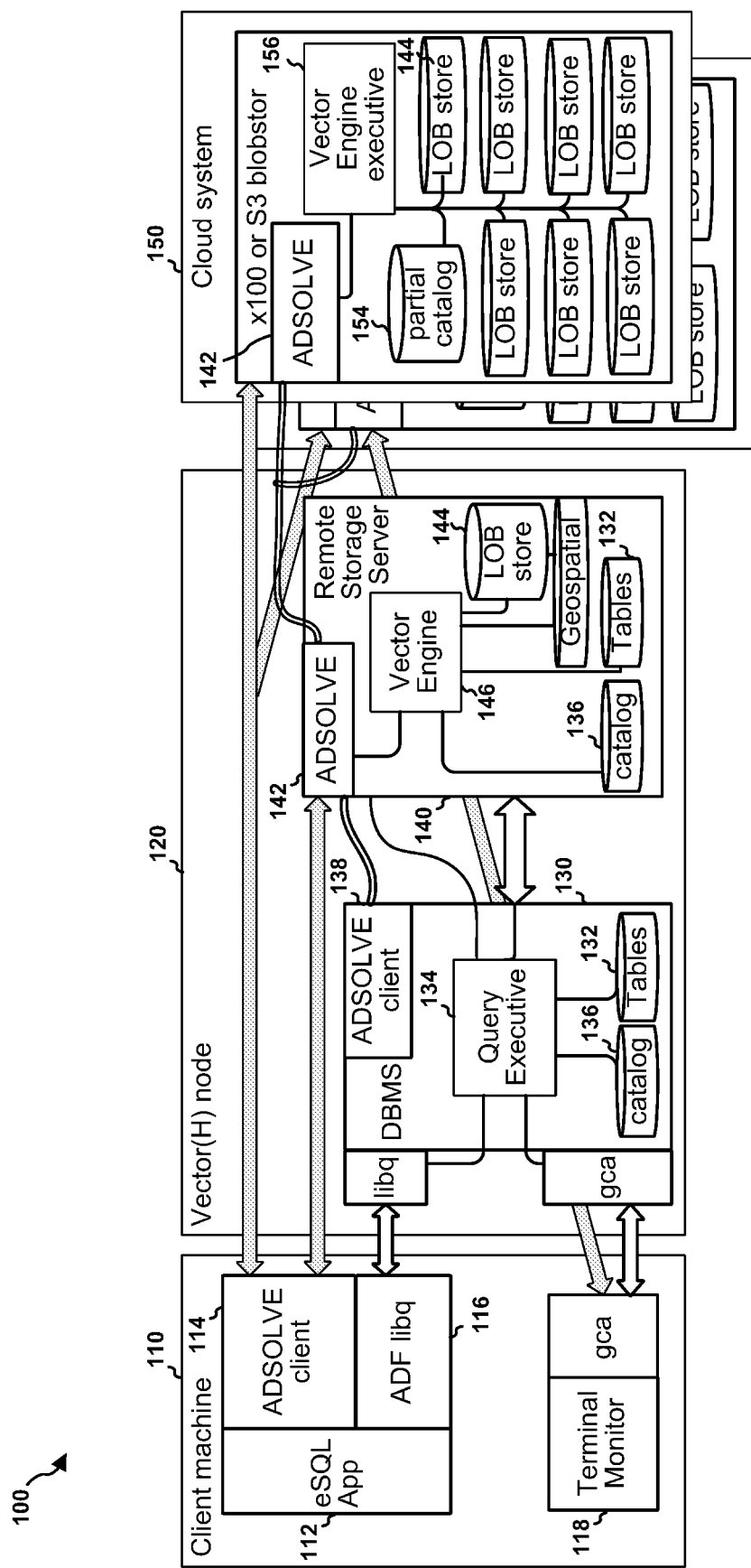
FIG. 1 is a diagram of an example computer system for providing large object storage in a database system, in accordance with an implementation of the present disclosure.

Referring now to FIG. 1, an example computer system 100 provides for large object storage in a database system. The computer system 100 may include a client machine 110, a vector node 120 and a cloud system 150.

The client machine 110 may be, for example, any mobile or fixed computer device including but not limited to a computer server, desktop or laptop or tablet computer, a cellular telephone, a personal digital assistant (PDA), a handheld device, any other computer device having wired and/or wireless connection capability with one or more other devices, or any other type of computerized device capable of processing communications related data. The client machine 110 may include a database application 112 such as eSQL. The database application 112 may, for example, generate database commands based on user input. The database application 112 may include a vector engine client 114 that provides direct access to one or more vector engines operating at either the vector node 120 or the cloud system 150. In some implementations, the vector engines may be referred to as an abstract data stored out of line vector engine (ADSOLVE). The vector engine client 114 may allow the client machine 110 to redeem a token for a large object. For example, the client machine 110 may obtain a representation of the large object from an external storage server (e.g., vector node 120 or the cloud system 150) based on the token. The database application 112 may also include an interface 116 (ADF libq) with a database management system (DBMS) 130 that transmits database commands or queries to the DBMS 130. The client machine 110 may further include a terminal monitor 118 that connects to the DBMS 130 via an interface (gca) to receive and display results.

The vector node 120 may include the DBMS 130. In some implementations, the vector node 120 may further include a remote storage server 140. The DBMS 130 may manage a database that may be stored in tables 132. A catalog 136 describes the tables 132 of the database. The DBMS 130 may include a query executive 134 that processes database commands from the client machine 110. The query executive 134 may manage the tables 132 and catalog 136. For example, the query executive 134 may perform database operations based on the received database commands. The tables 132 may be organized into rows and columns. As discussed in further detail below, the DBMS 130 may include a vector engine client 138 for performing database commands on multiple rows, some of which may include large objects stored at the remote storage server 140 or the cloud system 150.

The remote storage server 140 may store database tables and/or large objects. The remote storage server 140 may include a vector engine 146. The vector engine 146 may perform vector processing on multiple rows of a database. In some implementations, the vector engine 146 may include hardware support for parallel operations.

The remote storage server 140 may include a vector engine interface 142. The vector engine interface 142 may receive database commands represented as a vector. For example, the database command may indicate one or more operations and a vector on which to perform the operations. The vector engine interface 142 may be configured to perform a set of supported operations including database commands and object-specific operations. A vector may represent a sequence of rows from a column, so the ordering of the vector is important, both the external ordering of the sequence of vectors and the internal sequence in each vector. A vector may also be associated with a selection vector. The selection vector may be a bitvector indication of whether a vector element corresponding to a given table row is to be included or not. For example, a selection vector passed to the remote storage server 140 for processing of large objects may indicate which rows of the column store large objects.

The remote storage server 140 may include a large object (LOB) store 144. The LOB store 144 may store large objects that have a size greater than a column size. The LOB store 144 may store the large objects as separate files or objects in a data lake. For example, the LOB store 144 may store large geospatial objects. For instance, a geospatial object may be a model of a building. In some cases, a geospatial object (e.g., a model of a storage shed) may be small enough to be stored in a column. Other geospatial objects (e.g., a model of a hospital or office building) may be much larger than a column.

A cloud system 150 may be a web service provided by a third party. The third party may provide computing services such as application hosting and data storage. The cloud system 150 may host a remote storage to support the DBMS 130. For instance, the remote storage may include a vector engine interface 142, a vector engine executive 156, one or more LOB stores 144, and a partial catalog 154. From the perspective of the DBMS 130, the cloud system 150 may be hardware agnostic. For example, the cloud system 150 may provide a number of volume of LOB stores 144 accessible via a web address without providing details of the hardware storage devices. Similarly, the cloud system may host a vector engine executive 156 that virtualizes the vector engine 146. The vector engine executive 156 may not include hardware vector engine processing, but may provide similar performance on generic computing resources. The partial catalog 154 may include information about the structure of large data objects stored in the LOB store 144 and/or object specific operations for such large data objects.

As discussed above, the size of each column in a database (e.g., tables 132) may be limited. For example, the size of a column may be limited to 32 kilobytes (kB). The limited size of a column may present difficulties in storing objects that are larger than the column size.

In order to store large objects, the DBMS may utilize an extended tables (etab) system where the table stores a pointer to a large object in a remote system. The etab system may be, for example, a fixed width columns, row-store. For example, the large object may be stored in a LOB store 144 at the remote storage server 140, which may utilize a column-store which can store larger variable length data. While enabling storage of large objects, an etab system may have inefficiencies. For example, if some of the entries in the column are not large objects, the etab system may increase storage space. Additionally, retrieving objects via the etab system may increase traffic between the DBMS and the remote storage, for example, when the DBMS performs an operation on the column and all of the large objects are transferred between the DBMS 130 and the remote storage server 140. Such costs may be higher when the remote storage is a cloud system 150.

In an aspect, the present disclosure provides for storage of both small values and large objects in a column of a database table 132. The large objects may be associated with a token and the token may be used to redeem the large object as needed. The DBMS 130 may use the vector engine client 138 to communicate with the remote storage server 140 and/or the cloud system 150 via a vector engine interface 142. For example, the vector engine client 138 may request the remote storage server 140 to store one or more large objects. The vector engine interface 142 may determine whether to store the object at the remote storage server 140 or the cloud system 150. The vector engine interface 142 may provide an updated token with information about the location of the large object.

Figure 2:
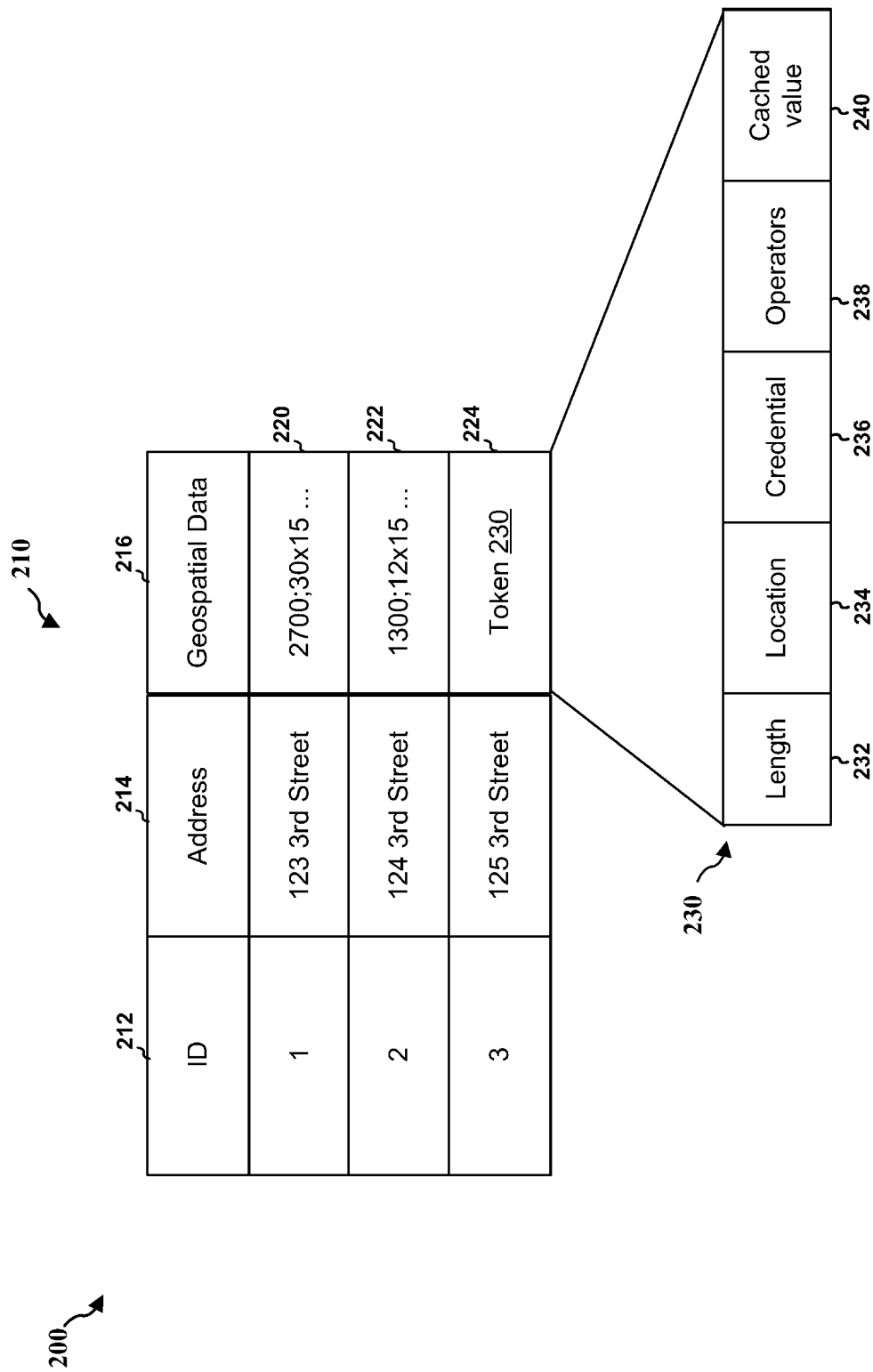
FIG. 2 is an example of a structure of a database including large objects, in accordance with an implementation of the present disclosure.

FIG. 2 is an example of a structure 200 of a database (e.g., tables 132) including both small values and large objects. For instance, the structure 200 may be a table 210 storing geospatial data. For simplicity, the table may store three columns: an identifier column 212, a street address column 214, and geospatial data column 216. The identifier may be an integer having a fixed size stored in a fixed width column. The address may be a variable length string, but all values are expected or required to be less than the maximum column width. The geospatial data may be a model of buildings at the address. For instance, the model may include information such as a total area of the building and dimensions of each room. For simple single story buildings, such models may be stored in a variable width column for example as illustrated for rows 220 and 222. Some models, however, are likely to be larger than the maximum column width and may be stored in an external storage as large objects. Such large objects may be represented in the table 210 as a token. For instance, the token 230 may represented the geospatial data for a row 224.

The token 230 may include information for identifying the token, redeeming the token, and processing the large object. For instance, the token 230 may include one or more of a length 232, a location 234, a credential 236, operators 238, or cached values 240.

The length 232 may be an integer value indicating a size of the token 230 in the column 216. Every row of a variable length column may include a length 232. In some implementations, the length 232 may be represented as a twos-complement value. For rows storing a small value, the length 232 may have a positive value. For rows storing a token, the length 232 may have a negative value indicating a token and a length of the token.

The location 234 may indicate a storage location of the large object. For example, the location 234 may be a URL indicating an address of the remote storage server 140 or the cloud system 150. The content of the location 234 may vary based on a type of remote storage. In some implementations, the location 234 may include a location class and a location 'address'. The following table summarizes location information for several types of remote storage:

TABLE 1

| Location Class | Primary Address | Description |
| --- | --- | --- |
| Ingres ETAB | DB_COUPON | Legacy structure to references exiting LOB data in-situ-retrieval only |
| DBMS Bucket File | Temporary, file backed, in-memory cache | Transient, out-of-line store for auxiliary results |
| DBMS Location File | Ingres Location, Filename/ID, offset | Storage Scheme-out-size files stand on their own, smaller get appended to a simple bucket file (or files graduated in size) and the offset records the location of the length prefix, which in turn gives the extent. |
| Local X100 | X100 store on attached X100, offset | X100 lob location file(s)-using above storage scheme |
| ADSOLVE File store | server address/name, reference, offset | ADSOLVE lob location file(s)-using above storage scheme |
| Third party | server address/name, reference, offset | |
| URL | Simple, whole URL | |
| Virtual | Characteristics | Source of 'n' bytes of manufactured data: stream of a single byte, repeatable 'pseudo-random data', unrepeatable etc. to facilitate testing |

As illustrated in FIG. 1, the database application 112 at the client machine 110 may use the location 234 to directly redeem the token from the remote storage server 140 or the cloud system 150. In some implementations, the location may be associated with the credential 236 that instructs the remote system to allow access to the large object.

The operators 238 may be a set of database operations and/or object specific operations to be performed on the large object. In some implementations, the DBMS 130 may defer certain operations on large objects. For instance, if an update command would make a small change to the stored model (e.g., incrementing a value), the DBMS 130 may add the operation to the token 230 without actually updating the large object. The DBMS 130 may wait until there are multiple operations on the large object or the token is redeemed to update the large object.

The cached value 240 may represent a value associated with the large object that may be frequently used instead of the full large object. For example, the cached value 240 may be a result of a previously performed operation for the large object. For instance, in the case of geospatial data, a value such as a total area or building footprint may be cached. The DBMS 130 may provide the cached value without redeeming the large object from the remote storage.

Figure 3:
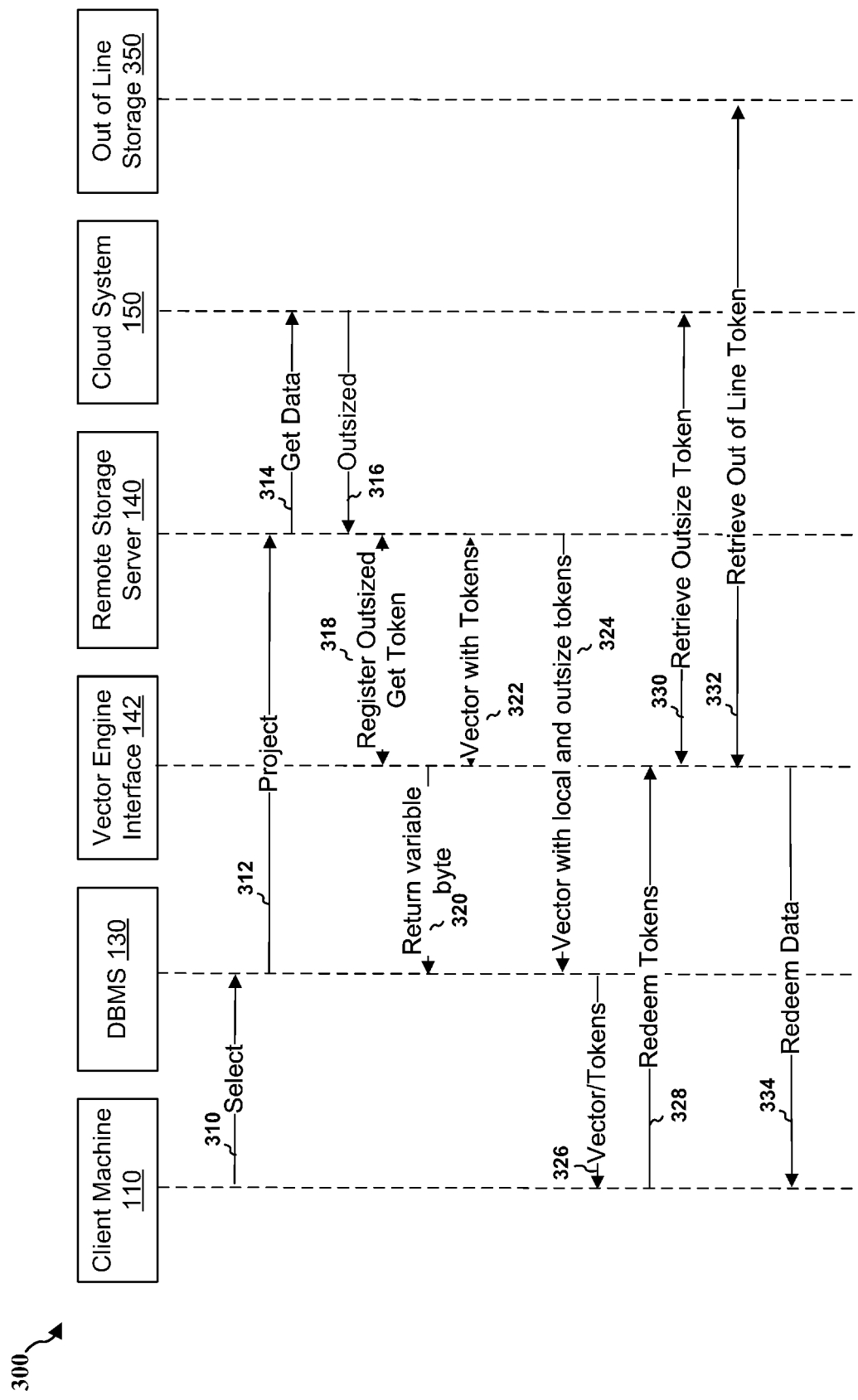
FIG. 3 is a message diagram illustrating communications among the components of the example computer system of FIG. 1, in accordance with an implementation of the present disclosure.

FIG. 3 is a message diagram 300 illustrating communications among the components of the system 100 for retrieving data according to an example use case. The client machine 110 may send a database command 310 to the DBMS 130 to request data. For example, the database command 310 may be a select command that identifies variable byte data that may be stored in the remote storage server 140. If the command requires remotely stored data, the DBMS 130 may project 312 the database command to the remote storage. The remote storage server 140 may determine that some of the data is stored in the cloud system 150 and issue a get data request 314. The cloud system 150 may return some columns of data and provide an outsized indication 316 that some of the requested data is outsized. The remote storage server 140 may register 318 the outsized data with the vector engine interface 142 and receive tokens. The vector engine interface 142 may return the available columns of data 320 to the DBMS 130. The vector engine interface 142 may fill a vector 322 with tokens for the outsized data for the remote storage server 140. The remote storage may return a vector 324 with local and outsized tokens to the DBMS. The DBMS may provide the vector and tokens 326 to the client machine 110. The vector and tokens 326 may be filtered by the DBMS. The client machine 110 may redeem 328 the tokens from the vector engine interface 142. The vector engine interface 142 may retrieve tokens from the respective location. For example, the vector engine interface 142 may retrieve outsize data tokens 330 from the cloud system 150. The vector engine interface 142 may retrieve out of line tokens 332 (e.g., third party or URL) from an out of line storage 350. The vector engine interface 142 may provide the redeemed data 334 to the client machine 110.

In an aspect, the database command may be a vector processing command having the following form:

```
int (*function)(int nrows, COLTYP* result [,COLTYP*param1, ...][,
HeapCtx*__r h][,bitvector *selector][,Expr *expr])
```

Depending on the datatype, the result and any parameters may each be an address of a vector of 'n' fixed width objects. For variable length object datatypes, this vector may be the vector of pointers to the varied length objects. If the result vector is to return a vector of varied length objects, then the varied length objects may be allocated using the heap context. This low-level interface for vector processing may operate in a distributed engine to interface with peer processing engines to enable proximal processing of as much data as possible. Where a query execution spans a network, the remote contributions may take the form of a set of result vectors derived from the completion of local evaluation. These vectors constitute a set of result columns or a result table.

In an aspect, moving or feeding result columns to result tables to the next distributed stage for inclusion may potentially result in latencies where a processing stage may remain idle while waiting for data transfer. To pass these structures efficiently, the system may start parallel consumption of columns for evaluation if a set of columns for a row is available and equally, the producer may produce a number of rows of data at a time. To this end, a data pipe structure may allow batching of rows of columns to facilitate differences in speed of consumer processes versus producer processes and also case row-wise access.

Figure 4:
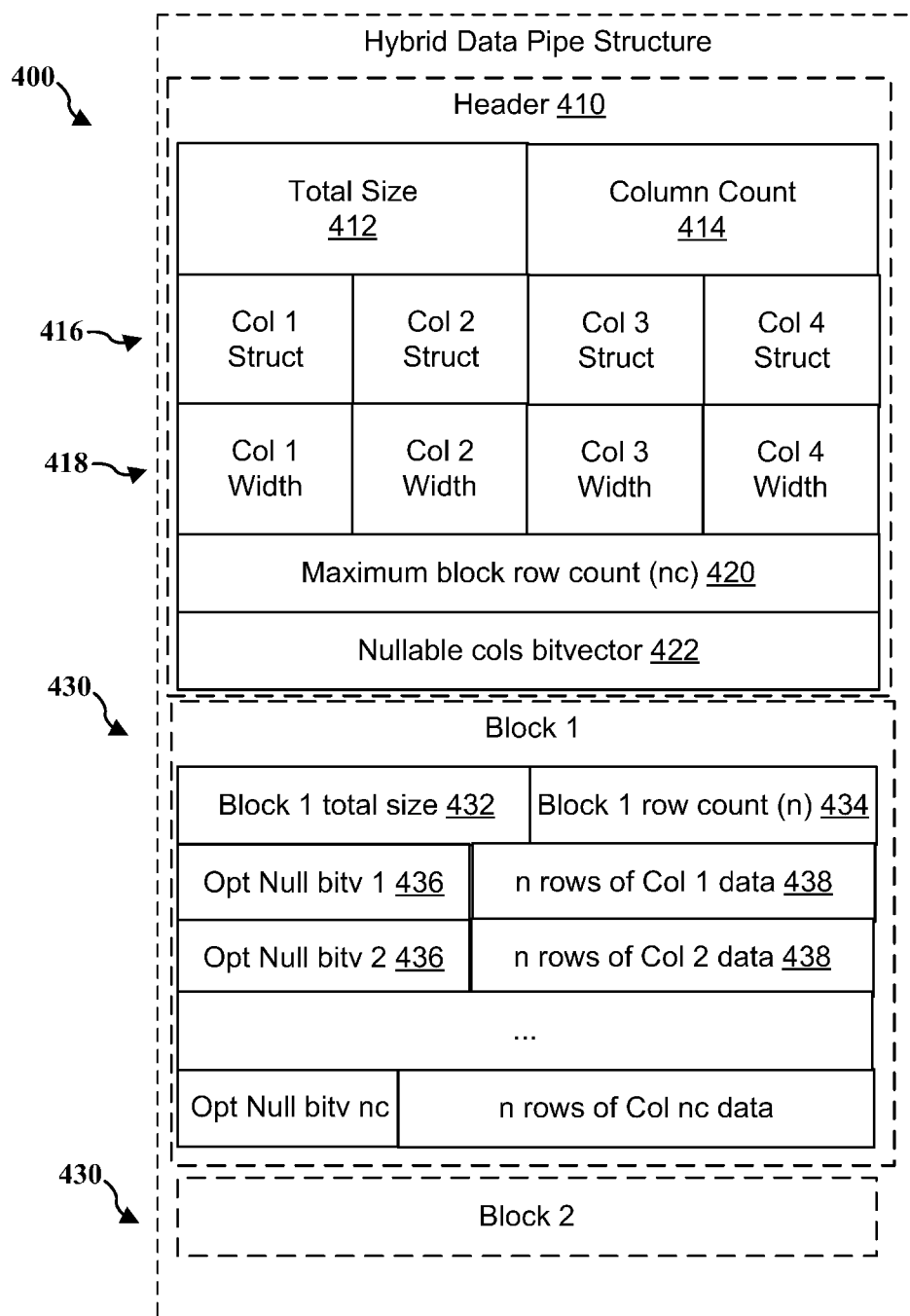
FIG. 4 is a diagram of an example hybrid data pipe structure, in accordance with an implementation of the present disclosure.

FIG. 4 is a diagram of an example hybrid data pipe structure 400. The hybrid data pipe structure 400 may be used to store data at an external storage (e.g., in a cache) and transfer the data to another location (e.g., a client). For instance, the hybrid data pipe structure 400 may be generated in response to a query at an external storage, returned to a requesting client, and stored in a cache at the external storage. The hybrid data pipe structure 400 may combine benefits of column storage and row storage. The hybrid data pipe structure 400 may be incrementally processed by either a column processing engine or a row processing engine, which may reduce idle time of the processing engine while waiting for data to arrive.

The hybrid data pipe structure 400 may represent a table of data having columns and rows. The hybrid data pipe structure 400 may include a header 410 and a plurality of blocks 430. The header 410 may include information about the structure of the table and the hybrid data pipe structure 400. For example, the header 410 may include a total size 412 of the header 410, a column count 414 indicating a number of table columns included in the hybrid data pipe structure 400, column structure information 416 defining a structure of each column (e.g., data type) a column width field 418 defining a width of each column, a maximum block row count (nc) 420, and a bitvector 422 defining nullable columns. The nc 420 may represent the usual blocking size used with the last block possibly including fewer rows. In some implementations, the nc 420 must be a multiple of 8. The nc 420 may be on the order of thousands of rows (e.g., 1024 rows). Each block may include block header information and up to the nc 420 number of rows of column data. The block header information may include a block total size 432 and a block row count (n) 434. The column data for each row may include an optional null bitvector 436 and n rows of column data 438. The n rows of column data 438 may include a vector of fixed width data columns as contiguous values. Variable length datatypes may also be contiguous. A masked length field of the variable length datatypes may be used to determine the extent of an element. In some implementations, an ASCII NUL terminated string form can also be represented as-is.

Each block 430 of the hybrid data pipe structure 400 may be transferred and processed separately. For example, the first block 430 may be transmitted from the remote storage server 140 or the cloud system 150 to the client machine 110 or the DBMS 130. Because the block 430 includes a full set of columns for n 434 rows, a column processing engine or a row processing engine may start operating on the rows or columns of the first block 430 while other blocks are being transferred. For instance, a column processing engine may efficiently operate on n elements of a row. A row processing engine may have complete information for each of the n rows. In contrast, if the remote storage were to transfer a large table with, for example, 1 billion rows using column storage, an entire first column of data may arrive before any other columns, so a row processing engine may remain idle until the complete table is received.

In some implementations, the processing engine may utilize the nullable columns bitvector 422 and the optional null bitvectors 436 to select valid data from the hybrid data pipe structure 400. For instance, some data in the external storage may be modified or become stale such that the data is no longer valid; however, removing such invalid data may alter a structure of the data storage. Instead, the nullable columns bitvector 422 and the optional null bitvectors 436 may identify the invalid data to be excluded when being processed. If the nullable cols bitvector 422 is set for a column, then data for that column in a block will be preceded by the optional null bitvector 436 modelling NULL values in the column. If the column is not nullable, the optional null bitvector 436 is not present. The row count for the last block may be rounded up to the next multiple of 8 for the purpose of locating the column data of the last block of NULLable columns. In some implementations, the nullable columns bitvector 422 or the optional null bitvectors 436 may be applied to a selector in the database command. Any input parameters and results may reflect the same number of rows as passed at the call and additionally the selector vector may be present to determine any deselected rows to be ignored in the call and result.

If a column result in a hybrid data pipe structure 400 was affected by restriction predicate or restrictive join, then there may be a qualifying selector that models this restriction. In the case of restriction, the selector is used to qualify onward use of the data. Although the selector is implicitly part of the result, the selector is modelled separately so that the base data can potentially be reused along with other selectors. A scenario that is often present in complex views is where a fragment of a query such as a scalar subselect, a derived table, a rollup grouping, or even a repeated joinset appears. These can often be calculated once, and the results incorporated multiple times as needed. If one of these blocks gets resolved remotely and the result transferred via a hybrid data pipe, then that one copy may be referred with potentially different qualifiers being applied at the various inclusion points without needing to construct a new locally qualified sub-result for each inclusion point. Such a partial result may also be cached for reuse with other queries referencing the same family of table access.

These partial results, whether held in a file cache such as a registration server or as a native column structured object in local cache, may be subject to timing out, being invalidated, and being available to be analyzed. In some implementations, if the partial results remain persistent in the cache long enough, a histogram for the partial results may be generated. For example, the histograms may be inputs to optimizer phases that summarize a column of data indicating characteristics of the distribution of data over the length of the column. For example, the histogram may provide distinct value counts or distributions of ranges. Other histogram data may include min and max values and counts of nulls. With a histogram for a column and a set of restrictions to that column, the system may estimate cardinality. Equally, with histograms for either side of a join operation, the system can 'join' the histograms to build a joint histogram and derive estimates of grouping impact. Caching histograms with fragments may ease repeated optimization.

A primary usage model for caching large objects is to put the data to one side for more convenient potential retrieval. Such a model might notionally involve materializing an object from an archive and retaining it in readiness for redemption within a specified timescale. The cache may have access control for a specific caller such as the user or process that cached the large object. In some cases, the cached large object may be deleted once collected. The cache entry may model timeliness, access restrictions, and the local system location. Generally, the remote storage and cache may attempt to not move any object unless there is no alternative. As shown in Table 1 above, a token may be cached with an indication of a location (e.g., primary address). The location may show what information to pass to which service routine to access the object. In some implementations, the cache may not store an indirection to another location site (e.g., an ADSOLVE File store) as that would imply a different ADSOLVE server that could be contacted directly.

The fuller cache form may model similar time limitations, time stamps, and access controls, but may also capture code fragments from which the data was derived, relevant histogram or statistics relevant to the data, and recreation costs. The result data (e.g., in a hybrid data pipe structure 400) is self-describing and will intrinsically match the result columns of the code fragment.

The cache may also allow for the partial or total invalidation of a cache entry by the creator. Partial invalidation may include marking an element as being degraded and potentially initiating a reconstruction of the data from the fragment. Creators of such data may register an interest in table updates to the source data as needed and then trigger the partial invalidations as required. Equally, requestors may choose to accept the stale data if the recreation costs would imply too costly a delay or if fresh data were unnecessary.

Figure 5:
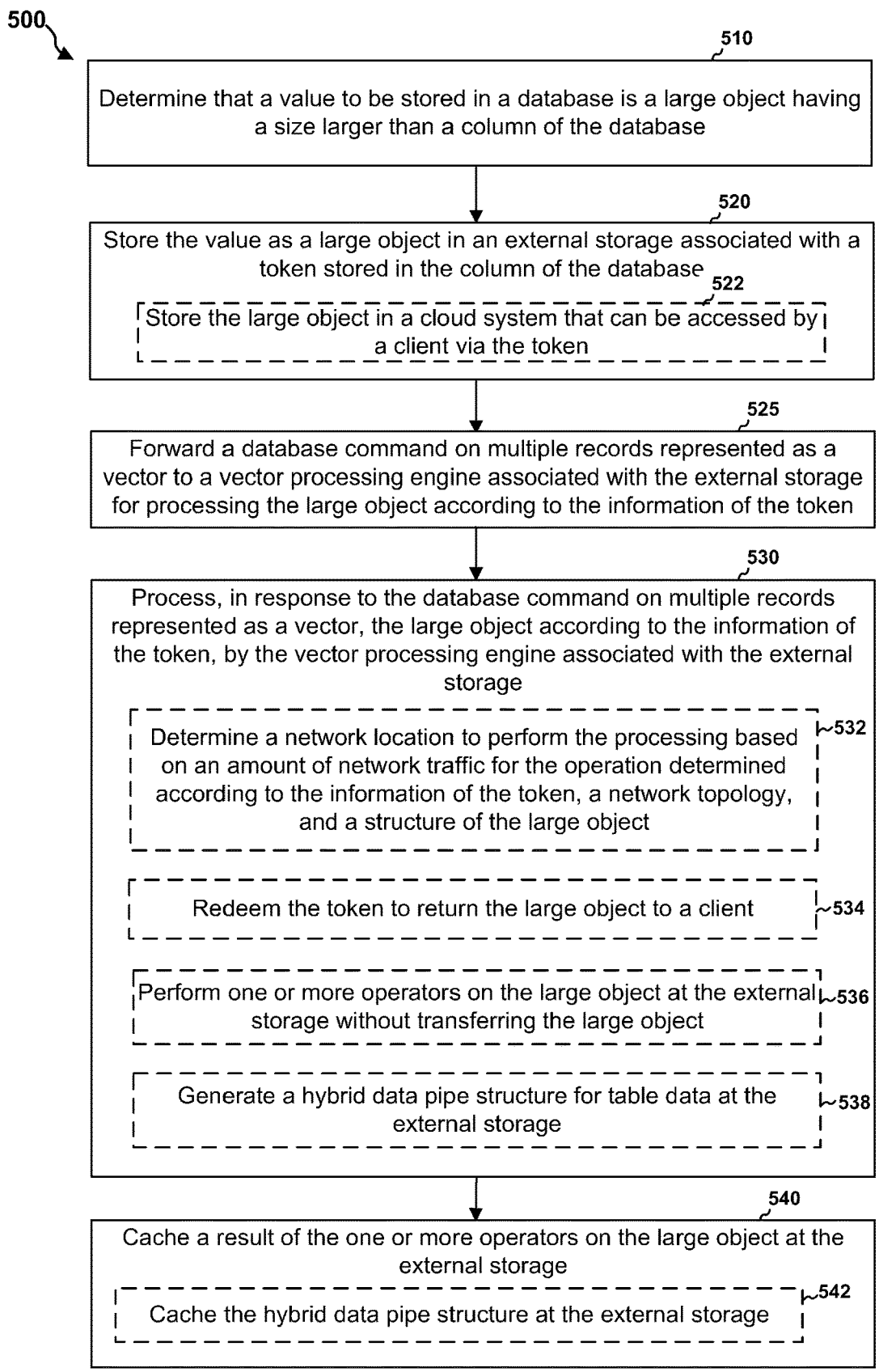
FIG. 5 is a flowchart of an example method of database operation, in accordance with an implementation of the present disclosure.

FIG. 5 is a flowchart of an example method 500 of database operation. The method 500 may be performed by the DBMS 130 in communication with one or both of the remote storage server 140 and the cloud system 150.

At block 510, the method 500 may include determining that a value to be stored in a database is a large object having a size larger than a column of the database. For example, the query executive 134 may determine that the value to be stored in a table 132, 210 of the database is a large object having a size larger than a column (e.g., geospatial data column 216). For example, the large object may be a geospatial model of a building including multiple rooms or floors. Other examples of large data objects that may be stored in a column with smaller values include images, videos, text, profiles, or collections of data. The DBMS 130 may compare a size of the value (i.e., a length of the object) with the maximum column size to determine whether the value is a large object.

At block 520, the method 500 may include storing the value as a large object in an external storage associated with a token stored in the column of the database. For example, the DBMS 130 may store the value as a large object in an external storage such as the remote storage server 140 or the cloud system 150. The DBMS may store the token 230 associated with the large object in the column (e.g., geospatial data column 216) of the table 132, 210. The token 230 may include information for processing the large object (e.g., length 232, location 234, credential 236, operators 238, and/or cached value 240). In some implementations, at sub-block 522, the block 520 may include storing the large object in the cloud system 150 that can be accessed by a client (e.g., client machine 110) via the token 230.

At block 525, the method 500 may include forwarding a database command on multiple records represented as a vector to a vector processing engine associated with the external storage for processing the large object according to the information of the token. For example, the DBMS 130 may forward a database command on multiple records represented as a vector to the vector engine 146 and/or the vector engine executive 156 associated with the external storage (e.g., remote storage server 140 or cloud system 150) for processing the large object according to the information of the token 230.

At block 530, the method 500 may include processing, in response to a database command on multiple records represented as a vector, the large object according to the information of the token, by the vector processing engine associated with the external storage. For example, the vector engine 146 and/or the vector engine executive 156 may process the large object according to the information of the token 230. The vector engine 146 and/or the vector engine executive 156 may process the large object in response to a database command from the DBMS via the vector engine interface 142. The database command may be represented as a vector of multiple records. In some implementations, the vector is associated with a selection vector indicating which records the vector engine is to process.

In some implementations, at sub-block 532, the block 530 includes determining a network location to perform the processing based on an amount of network traffic for the operation determined according to the information of the token, a network topology, and a structure of the large object. For instance, the vector engine interface 142 may determine the network location. The vector engine interface 142 may attempt to reduce the amount of network traffic. For instance, at sub-block 534, the vector engine interface 142 may redeem to token to return the large object to a client. If the database command indicates further operations on the large object, the vector engine interface 142 may defer the operations to the client. In contrast, if the database command includes operators that reduce the size of the data to be transferred (e.g., determining a metric of the model), the vector engine interface 142 may perform the processing prior to returning the value. As another example, at sub-block 536, the block 530 may include performing one or more operators on the large object at the external storage without transferring the large object. For instance, if the network command modifies the large object, the vector engine interface 142 may perform the modification without transferring the large object back to the DBMS 130 or the client machine 110. In some implementations, at sub-block 538, the block 530 may include generating a hybrid data pipe structure 400 for table data at the external storage. For instance, the hybrid data pipe structure 400 may be used to transfer the results of the operation to a client.

At block 540, the method 500 may include caching a result of the one or more operators on the large object at the external storage. For example, the vector engine 146 and/or the vector engine executive 156 may cache the result of the one or more operators in a local storage. In some implementations, at sub-block 542, the block 540 may include caching the hybrid data pipe structure 400 at the external structure.

Figure 6:
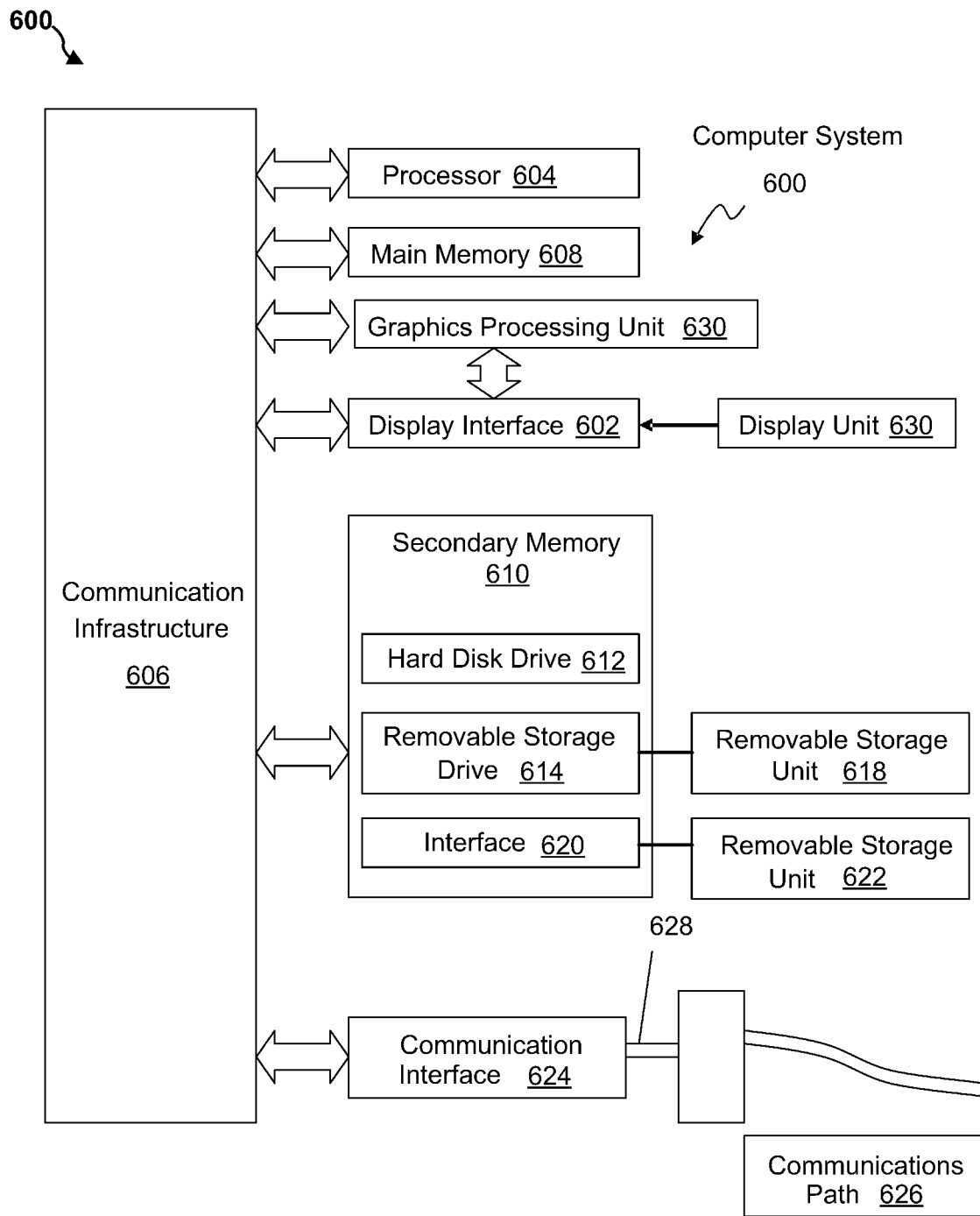
FIG. 6 presents an example of a system diagram of various hardware components and other features, for use in accordance with aspects of the present disclosure.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein. FIG. 4 presents an example system diagram of various hardware components and other features that may be used in accordance with aspects of the present disclosure. Aspects of the present disclosure may be implemented using hardware, software, or a combination thereof and may be implemented in one or more computer systems or other processing systems. In one example variation, aspects of the disclosure are directed toward one or more computer systems capable of carrying out the functionality described herein. An example of such a computer system 600 is shown in FIG. 6.

Computer system 600 includes one or more processors, such as processor 604. The processor 604 is connected to a communication infrastructure 606 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 600 may include a display interface 602 that forwards graphics, text, and other data from the communication infrastructure 606 (or from a frame buffer not shown) for display on a display unit 630. Computer system 600 also includes a main memory 608, preferably random access memory (RAM), and may also include a secondary memory 610. The secondary memory 610 may include nonvolatile memory, for example, a hard disk drive 612, flash memory and/or a removable storage drive 614, representing a floppy disk drive, a magnetic tape drive, an optical disk drive, etc. The removable storage drive 614 reads from and/or writes to a removable storage unit 618 in a well-known manner. Removable storage unit 618, represents a USB memory drive, SD card, floppy disk, magnetic tape, optical disk, etc., which is read by and written to removable storage drive 614. As will be appreciated, the removable storage unit 618 includes a computer usable storage medium having stored therein computer software and/or data.

In alternative aspects, secondary memory 610 may include other similar devices for allowing computer programs or other instructions to be loaded into computer system 600. Such devices may include, for example, a removable storage unit 622 and an interface 620. Examples of such may include a program cartridge and cartridge interface (such as that found in video game devices), a removable memory chip (such as an erasable programmable read only memory (EPROM), or programmable read only memory (PROM)) and associated socket, and other removable storage units 622 and interfaces 620, which allow software and data to be transferred from the removable storage unit 622 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a Personal Computer Memory Card International Association (PCMCIA) slot and card, etc. Software and data transferred via communications interface 624 are in the form of signals 628, which may be electronic, electromagnetic, optical, or other signals capable of being received by communications interface 624. These signals 628 are provided to communications interface 624 via a communications path (e.g., channel) 626. This path 626 carries signals 628 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 614, a hard disk installed in hard disk drive 612, and signals 628. These computer program products provide software to the computer system 600. Aspects of the disclosure are directed to such computer program products.

Computer programs (also referred to as computer control logic) are stored in main memory 608 and/or secondary memory 610. Computer programs may also be received via communications interface 624. Such computer programs, when executed, enable the computer system 600 to perform various features in accordance with aspects of the present disclosure, as discussed herein. In particular, the computer programs, when executed, enable the processor 604 to perform such features. Accordingly, such computer programs represent controllers of the computer system 600.

In variations where aspects of the disclosure are implemented using software, the software may be stored in a computer program product and loaded into computer system 600 using removable storage drive 614, hard disk drive 612, or communications interface 620. The control logic (software), when executed by the processor 604, causes the processor 604 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

Figure 7:
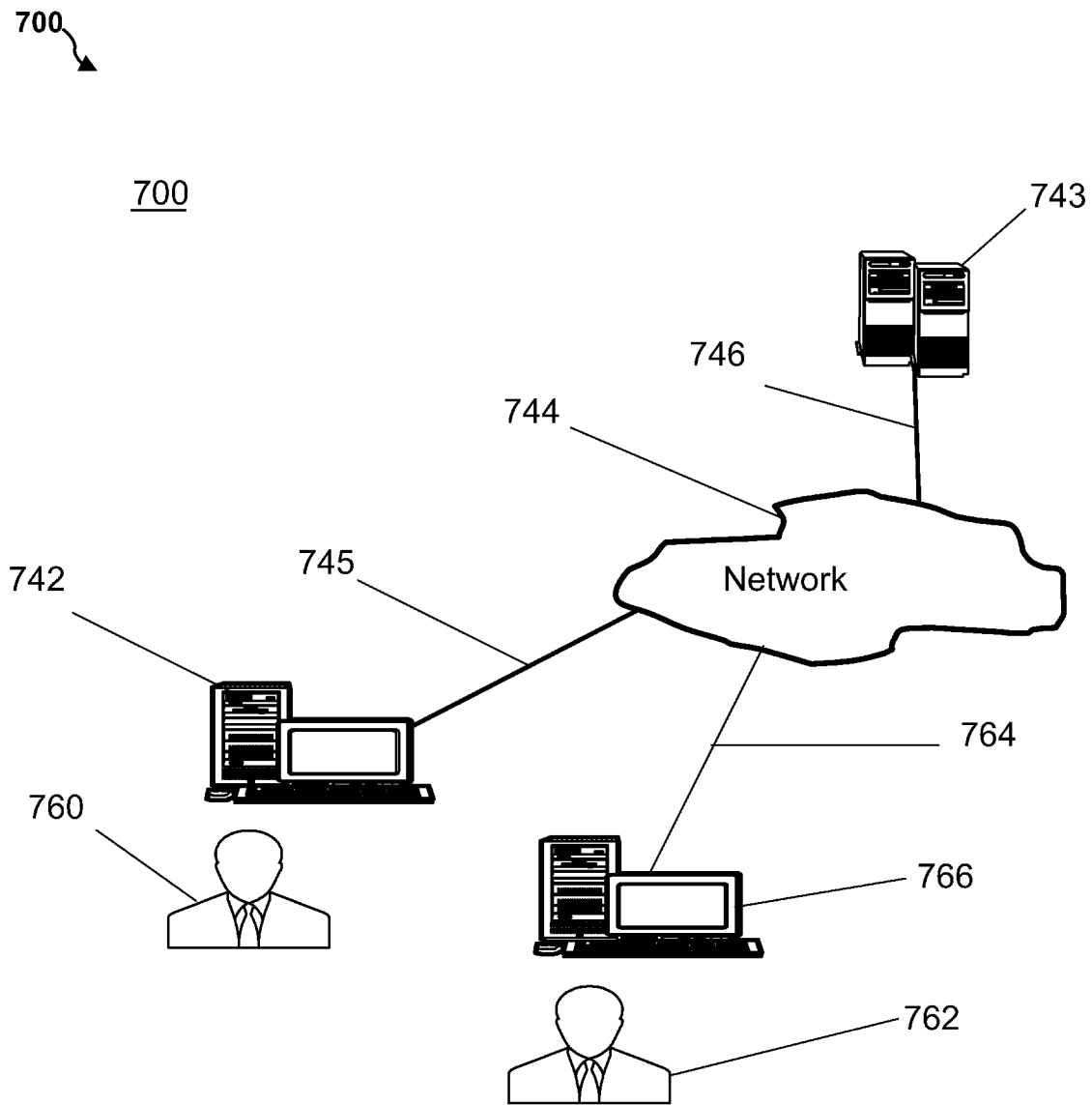
FIG. 7 is a block diagram of various examples of system components, for use in accordance with aspects of the present disclosure.

FIG. 7 is a block diagram of various example system components (e.g., on a network) that may be used in accordance with aspects of the present disclosure. The system 700 may include one or more accessors 760, 762 (also referred to interchangeably herein as one or more "users") and one or more terminals 742, 766. In one aspect, data for use in accordance with aspects of the present disclosure may, for example, be input and/or accessed by accessors 760, 762 via terminals 742, 766, such as personal computers (PCs), minicomputers, mainframe computers, microcomputers, telephonic devices, or wireless devices, such as personal digital assistants ("PDAs") or a hand-held wireless devices coupled to a server 743, such as a PC, minicomputer, mainframe computer, microcomputer, or other device having a processor and a repository for data and/or connection to a repository for data, via, for example, a network 744, such as the Internet or an intranet, and couplings 745, 746, 764. The couplings 745, 746, 764 include, for example, wired, wireless, or fiber optic links. In another example variation, the method and system in accordance with aspects of the present disclosure operate in a stand-alone environment, such as on a single terminal.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. A person skilled in the art should understand and appreciate that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the aspects disclosed herein may be implemented or performed with a specially-programmed one of a general purpose processor, a GPU, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or procedure described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. A storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or procedure may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. Computer-readable media includes may be referred to as non-transitory computer-readable media. Non-transitory computer-readable media may exclude transitory signals. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

This written description uses examples to disclose aspects of the present disclosure, including the preferred variations, and also to enable any person skilled in the art to practice the aspects thereof, including making and using any devices or systems and performing any incorporated methods. The patentable scope of these aspects is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various variations described, as well as other known equivalents for each such aspect, can be mixed and matched by one of ordinary skill in the art to construct additional variations and techniques in accordance with principles of this application.

What is claimed is:

1. A method of database operation, comprising:
   storing a large object having a size larger than a column of a database in an external storage associated with a token stored in the column of the database;
   receiving, at a vector processing engine associated with the external storage, a database command from a client on multiple records represented as a vector including the token for processing the large object according to the token, wherein the token includes one or more operators to be applied to the large object;
   performing the one or more operators on the large object at the external storage without transferring the large object to the database; and
   caching a result of the one or more operators on the large object at the external storage.

2. The method of claim 1, wherein processing the large object includes determining a network location to perform the one or more operators based on an amount of network traffic for the one or more operators determined according to the token, a network topology, and a structure of the large object.

3. The method of claim 1, further comprising:
   returning a second token to the client, the second token referring to the cached result; and
   redeeming the token to return the large object to the client from the cache.

4. The method of claim 1, wherein storing the large object comprises storing the large object in a cloud system that can be accessed by a client via the token.

5. The method of claim 1, wherein the token includes a cached value of a previously performed operation for the large object.

6. The method of claim 1, wherein the database command on multiple records represented as a vector indicates the large object associated with at least one of the records.

7. The method of claim 1, wherein the processing includes generating a hybrid data pipe structure for table data at the external storage, the hybrid data pipe structure defines a block size as a maximum number of rows that is less than a number of rows of the table data, wherein each block of the hybrid data pipe structure includes column data up to the maximum number of rows for each of the number of columns of the table data.

8. The method of claim 7, wherein the hybrid data pipe structure includes a first bitvector indicating nullable columns of the table data and a second bitvector for each nullable column indicating null values for rows of the column.

9. The method of claim 7, further comprising caching the hybrid data pipe structure at the external storage.

10. A system for storing large objects in a database, comprising:
    a database management system that stores a database table having a maximum column size; and
    an external storage server storing a large object having a size larger than a column of the database table, the large object associated with a token stored in the column of the database table, wherein the token includes information for processing the large object, wherein the external storage server is configured to
       receive a database command on multiple records represented as a vector including the token at a vector processing engine associated with the external storage for processing the large object according to the information of the token, wherein the token includes one or more operators to be applied to the large object;
       perform the one or more operators on the large object at the external storage without transferring the large object to the database management system; and
       cache a result of the one or more operators on the large object at the external storage.

11. The system of claim 10, further comprising a client device including a database application configured to:
    determine that a record in the database table includes the token; and
    obtain the cached result from the external storage server.

12. The system of claim 10, wherein the external storage server is accessible via a cloud service, wherein the cloud service includes a virtual vector processing engine configured to process database commands for large objects stored at the cloud service.

13. The system of claim 10, wherein the vector processing engine of the external storage server is configured to perform a set of supported operations including database commands and object-specific operations.

14. The system of claim 10, wherein the column of the database includes multiple records including some records represented as tokens and some records represented as values.

15. The system of claim 10, wherein the vector engine is configured to generate a hybrid data pipe structure for table data at the external storage, the hybrid data pipe structure defines a block size as a maximum number of rows that is less than a number of rows of the table data, wherein each block of the hybrid data pipe structure includes column data up to the maximum number of rows for each of the number of columns of the table data.

16. The system of claim 15, wherein the hybrid data pipe structure includes a first bitvector indicating nullable columns of the table data and a further bitvector for each nullable column indicating null values for rows of the column.

17. The system of claim 15, wherein the external storage server is configured to cache the hybrid data pipe structure at the external storage.

18. The system of claim 10, wherein the external storage server is configured to determine a network location to perform the processing based on an amount of network traffic for the processing determined according to the information of the token, a network topology, and a structure of the large object.

19. The system of claim 10, wherein the token includes a cached value of a previously performed operation for the large object.

20. The system of claim 10, wherein to cache the result of the one or more operators on the large object, the external storage server is configured to:
- retain the result in readiness for redemption within a specified timescale with access control for a specific caller; and
- delete the result once the result is collected or expired.

* * * * *